United States Patent [19]
Snow et al.

[11] Patent Number: 5,297,225
[45] Date of Patent: Mar. 22, 1994

[54] OFF-AXIS OPTICAL ROTARY JOINT

[75] Inventors: James W. Snow, Bedford; Ian B. MacKay; Kenneth Bowers, both of Dartmouth, all of Canada

[73] Assignee: Focal Technologies Incorporated, Dartmouth, Canada

[21] Appl. No.: 894,338

[22] Filed: Jun. 4, 1992

[51] Int. Cl.⁵ .............................................. G02B 6/34
[52] U.S. Cl. ................... 385/25; 250/227.11
[58] Field of Search ............... 385/25, 53, 139; 356/153, 138, 152, 73.1; 250/227.24, 227.11, 551, 552

[56] References Cited

U.S. PATENT DOCUMENTS

| | | | |
|---|---|---|---|
| 4,441,785 | 4/1984 | Petrozello | 385/25 |
| 4,848,871 | 7/1989 | Seidel et al. | 385/25 X |
| 4,934,783 | 6/1990 | Jacobson | 385/25 |
| 5,016,961 | 5/1991 | Aldrich | 385/25 |
| 5,173,958 | 12/1992 | Folsom et al. | 385/25 X |

*Primary Examiner*—Akm E. Ullah
*Attorney, Agent, or Firm*—Jones, Tullar & Cooper

[57] ABSTRACT

The present invention provides an off-axis rotary joint for optical signal transfer. An annular waveguide has optical discontinuity means, such as a plurality of circumferentially equally spaced apart notches directed inwardly thereof, which discontinuities intercept a light beam emanating from a light source near the waveguide. The discontinuities direct light into the waveguide, along which it travels until it meets an internal reflecting member which, in turn reflects the travelling light out of the waveguide to a suitable detector. The light source and the waveguide/reflector/detector are relatively rotatable so that the signal strength at the detector is an indication of the position of the light source relative to the waveguide. The invention has practical applicability in apparatus, such as turrets and CT scanners, in which the central shaft or axis area must be occupied by equipment or personnel rather than componentry of the rotary joint.

30 Claims, 6 Drawing Sheets

OFF-AXIS OPTICAL ROTARY JOINT

BACKGROUND OF THE INVENTION

The properties of optical waveguides such as optical fibers make them an ideal choice of medium for carrying signals in an ever-increasing number of applications. These properties include high bandwidth (signal carrying capacity), immunity to interference, absence of radiation, low loss, light weight and low bulk. Optical fiber is often used in conjunction with electrical cables for carrying power, in applications such as turrets, remotely operated vehicles for hazardous locations, and industrial workstations. In such applications the composite cable is winched or reeled, requiring a slip ring or rotary joint assembly at the reel, to permit the payout or retraction of cable while allowing continuous operation of the remote equipment.

Electrical slip rings for the copper wires carrying power are well established, and fiber optic rotary joints have more recently appeared. However the use of fiber optic rotary joints has been somewhat limited by their performance, a particular weakness being the need to occupy the central axis of rotation of the rotary joint. This is a severe limitation in many cases, where shafts must occupy the axis of rotation, such as web dryers, stacker-reclaimers, rotating stages, shipboard winches, and many other applications. In other cases, people must occupy the central axis, such as in medical scanners and armoured vehicles.

Signal quality problems with electrical slip rings in CT scanner systems have indicated a potential requirement for an off-axis rotary joint. X-ray discharge causes interference with electrical signals passing through electrical slip rings and data rates with such systems need improvement. Optical fibers would overcome most of the problems in such equipment.

In armoured vehicles there is a trend towards the use of fiber optics for voice, video and digital signals to replace the electrical systems, giving higher bandwidth, reduced bulk and weight and absence of interference or radiation. As the turret rotates relative to the vehicle body, a slip ring or rotary joint is required. This has traditionally been located on-axis, to take advantage of available technology. However, a rotary joint having a hollow bore or shaft area would provide significant benefits by permitting easier movement of personnel and ammunition along the central area of the turret.

Many industrial installations can benefit from the advantages of fiber optics if they can replace noise-prone electrical data/control systems. Those having a rotational interface include cranes, mining machines, tethered vehicles, pulp/web dryers, machining turrets and many others. In some cases the central axis must be occupied by a shaft or other objects, demanding that the rotary joint operate off-axis.

SUMMARY OF THE INVENTION

As indicated above many of the problems of electrical systems can be overcome with optical data retrieval and transmission systems. In particular a hollow-bore optical joint having a bore diameter from a few centimeters up to several meters can, in principle, serve all of these applications, giving the inherent benefits of optics while leaving the axis of rotation free. The present invention provides just such an off-axis rotary joint.

The off-axis rotary joint of the present invention utilizes an annular or "hoop"-shaped waveguide having means to couple optical signals transversely into and out of the hoop waveguide. The coupling means for injecting the signals into the waveguide may be, for example, a roughened or abraded region of the waveguide surface, a groove in the surface, or a plurality of notches evenly spaced around the perimeter or the waveguide. The coupling means of this invention may thus be broadly termed as optical discontinuity means and will be referred to hereinafter as such. Light is injected into the waveguide via the optical discontinuity means, the source of light being able to rotate freely about the waveguide. The optical discontinuity means intercept the light beam and thus provide continuous coupling into the ring. Light is coupled out of the waveguide at a particular point by way of an internal 45° reflector. A bidirectional (full duplex) link can be realized using two annular waveguides, each with its own optical discontinuity means, light source, detector and electronics.

The device of the present invention can carry analog or digital signals but it is best suited to digital systems. The rotary joint can operate at high data rates (e.g. 125 Mbps) at very low bit error rates ($10^{-12}$) at rotary speeds of 100 rpm. The waveguide material can be glass or a thermoplastic such as acrylic. Its diameter may be up to 2 meters or more.

Off-axis operation implies high losses in passive fiber optic systems. The present invention utilizes active devices. Although the source can be remoted some distance on an optical fiber, the detector is mounted near the periphery of the waveguide to improve coupling. Theoretically, the detector could also be remoted on an optical fiber link, but the losses are generally high even if a large core fiber is used.

In summary, therefore, the present invention may be considered to provide an optical joint for off-axis optical signal transfer comprising: a source of light; an annular optical waveguide member having optical discontinuity means for coupling a light beam emanating from the source into the waveguide; means for reflecting light from the waveguide member; and detector means adjacent the reflecting means for intercepting light reflected out of the waveguide member; the light source being rotatable relative to the waveguide member, reflecting means and detector means.

DESCRIPTION OF THE PREFERRED EMBODIMENTS

Figure 1:
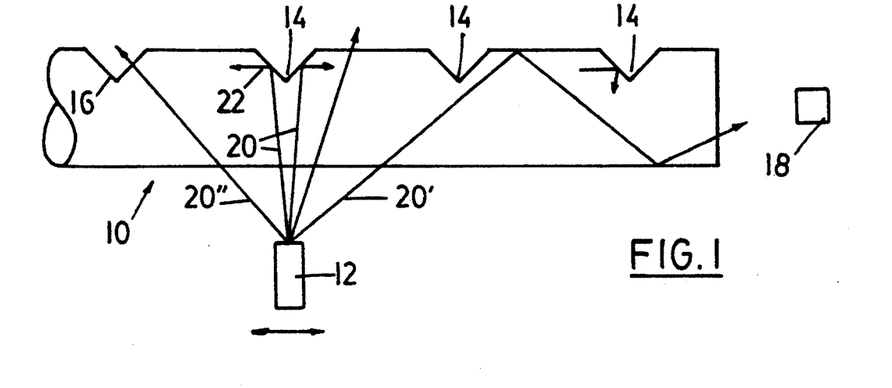
FIG. 1 shows the manner in which light is coupled from an optical fiber into a notched rod waveguide.

FIG. 1 of the drawings illustrates the basic principles for the present invention. A cylindrical rod waveguide 10 is provided with optical discontinuities in the form of a plurality of equally spaced apart notches 14 along the length thereof, the notches intercepting light from a light source 12 and reflecting a percentage of the light into the waveguide. As shown in FIG. 1, the notches 14 are generally in the form of a V, cut into the rod waveguide, and having symmetrical sloping side walls 16. A detector 18 is positioned adjacent the waveguide so as to intercept light emanating from the waveguide.

FIG. 1 illustrates as well the manner in which the light is reflected within the rod waveguide 10. For a beam 20 of light striking a single notch 14 at the center there will be optimum coupling, with the beam being split into components 22 travelling along the waveguide in opposite directions. Very poor coupling will occur when the beam 20 falls between two notches. A single notch will fall within the spread of the beam when the source 12, or the end of an optical fiber connected to the source, is in close proximity to the waveguide. By pulling the source back from the waveguide more notches are illuminated at one time, the beams 20' being shown to demonstrate this spread. Of course, some of the light, see the beams 20'', is reflected out of the waveguide by the notches, or even just passes therethrough.

There must be a trade-off between high efficiency source coupling and signal attenuation within the waveguide. There is an inherent 3 dB loss due to the bidirectional splitting of the signal, see beams 22. Thus large notches and/or tightly spaced notches are the most efficient from the standpoint of light coupling. However, because the notches also reflect a portion of the coupled light out of the waveguide, the signal is attenuated as it travels along the waveguide to the detector 18. Some experimentation is required to establish a satisfactory and acceptable level of attenuation with respect to desired coupling efficiency.

Figure 1A:
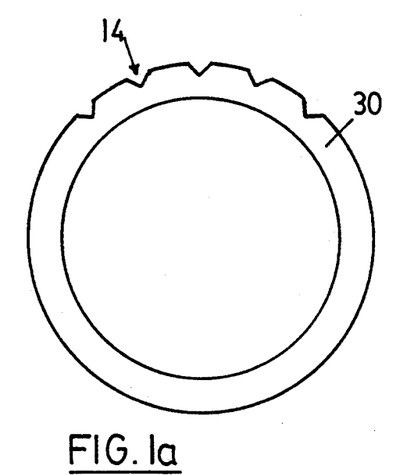
FIGS. 1a, 1b, and 1c show three forms of a notched annular waveguide to be used with the present invention.
Figure 1B:
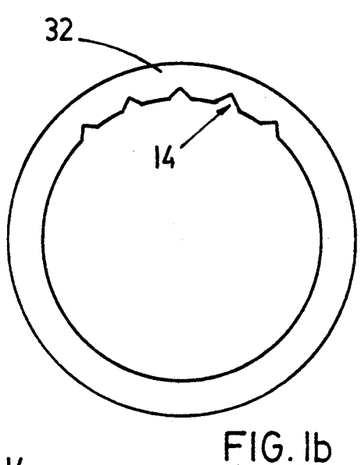
Figure 1C:
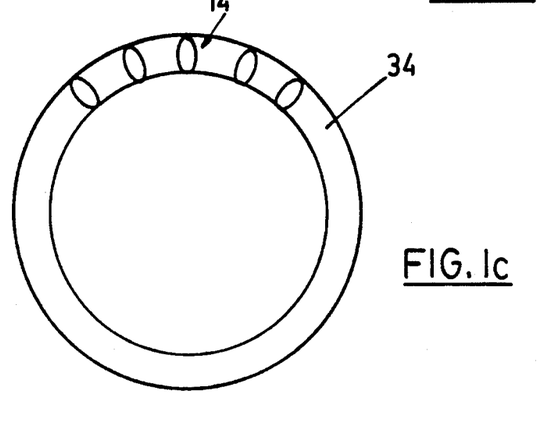

While FIG. 1 describes, generally a straight cylindrical rod-like waveguide, the present invention utilizes a continuous version of the waveguide formed into an annular ring. The notches may be on the outer periphery of the ring; they may be on the inner periphery of the ring; or they may be positioned around the side of the ring. FIGS. 1a, 1b and 1c illustrate these forms 30, 32 and 34 of the annular waveguide with the notches 14 being appropriately positioned. The particular form of the waveguide, and the consequent positioning of the source and detector, will depend on the particular application in which the present invention is to be utilized.

Figure 1D:
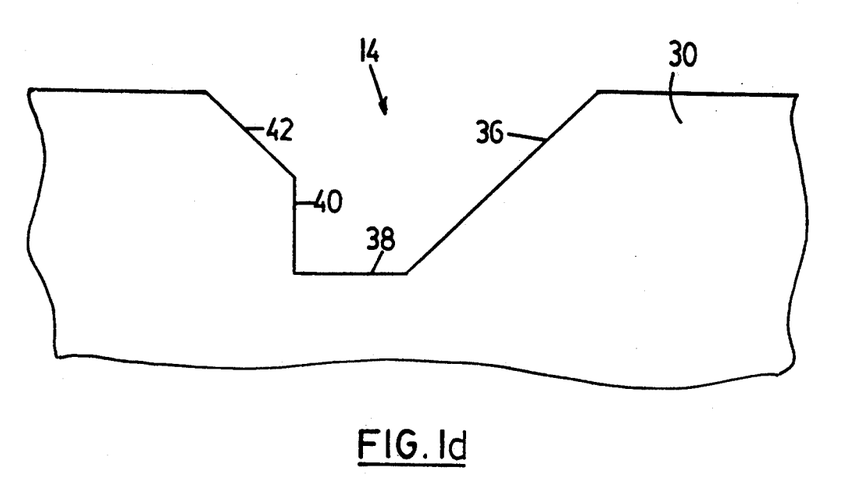
FIG. 1d shows the generalized notch configuration.

FIG. 1d illustrates a generalized notch configuration which permits control of the amount of light coupled into the waveguide in each direction. The notch 14 includes a first side 36 angled at about 45° to a radial plane of the waveguide 30, a bottom side 38 at about 90° to the radial plane, a short radial side 40 extending outwardly from the bottom side 38 parallel to the radial plane, and a second angled side 42 making an included angle with the first side 36 of about 90°. Sides 36 and 42 serve to reflect light rays or beams from the source into the notched waveguide. The ratio of the areas of these sides determines the ratio of the light coupled in each direction. By removing surface 42, the waveguide will conduct light in a unidirectional fashion. Sides 38 and 40 do not serve any significant functions. Side 38 has been found, however, to facilitate the manufacture of the notched waveguide.

More light can be injected into the waveguide by using multiple sources. In addition the power fluctuations due to the use of notches, as described above, can be minimized with two sources or by splitting a fiber from a single source. By separating the dual sources a distance equal to one half of the notch spacing, one source will produce maximum coupling when the other is minimized, thereby reducing dynamic variations.

A key to this invention is the ability to couple light transversely to the direction that the light travels in the waveguide. The notches described above represent one means of achieving this coupling; others entail the use of an abraded or roughened area on the surface of the waveguide, or a groove parallel to the waveguide axis, or a beam splitter. All of these coupling means fall into the general category of optical discontinuities. Any such optical discontinuity will serve to couple some light.

Figure 2A:
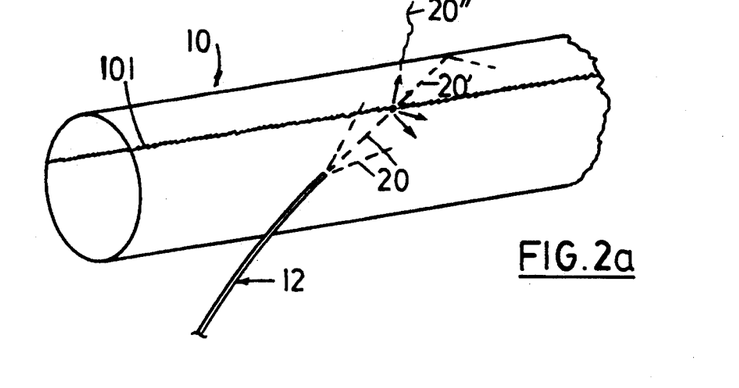
FIGS. 2a to 2d show other coupling means in the form of optical discontinuities which are effective with this invention.

FIG. 2a shows the waveguide 10 with a roughened or grooved area (diffuser) 101, which would be in the vicinity of 1 mm in width. When light 20 from the source 12 strikes the diffuser, light is scattered in many directions. A portion of the light, such as beam 20', is within the acceptance angle of the waveguide and propagates axially; light that is outside the acceptance angle, e.g. beam 20'', is lost. This critical angle is defined by the refractive indices of the waveguide and of the surrounding air (Snell's Law).

Figure 2B:
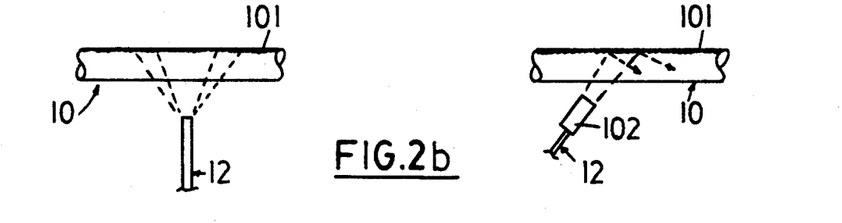

Coupling can be improved and made to favour one direction of propagation by angling the source away from the perpendicular as shown in FIG. 2b. The angle cannot be too far from the perpendicular or light will be reflected from the waveguide surface rather than be refracted in. This critical angle is defined by Snell's Law as above.

Figure 2C:
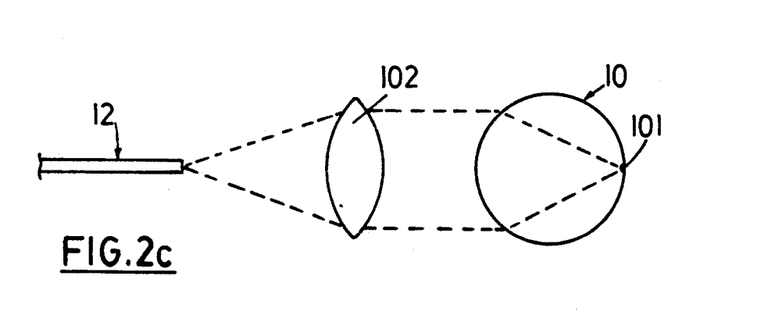

Coupling is further aided by the use of a collimating lens 102, which could be a double convex, graded index rod, or other type of lens, as shown in FIG. 2b and 2c. This minimizes losses due to higher-angle beams striking the curved waveguide and being reflected away, and also takes advantage of the focusing properties of the waveguide itself, as shown in section in FIG. 2c.

Figure 2D:
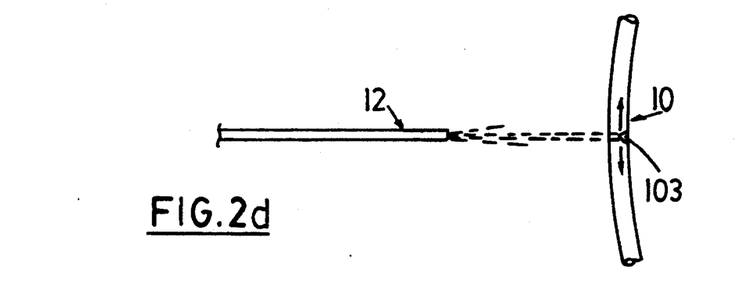

FIG. 2d shows a beam splitter 103 in the waveguide to serve as a bidirectional coupler, as an alternative to the notches, groove or abraded diffuser. As the source 12 is in most cases rotating relative to the waveguide 10 a multiplicity of such splitters is required as in the case of the notches.

The larger the optical discontinuity, e.g. the larger the abraded area, the more of the source light is coupled into the waveguide; however, the attenuation over length also increases with the size of the discontinuity. Hence there is a trade-off as in the case of the number and spacing of notches.

Light emitting diodes (LEDs) and laser diodes are readily available at wavelengths of 1300 nm, 1550 nm and 650–850 nm. Since lasers can provide 10–100 times more optical power than LEDs and operate at higher speeds, they are the best choice even though they are more expensive than LEDs.

Signal losses in the annular waveguide result from two processes, namely light absorption by the material of the waveguide and light diversion out of the waveguide by interfering notches or other coupling discontinuities (e.g. abrasions). As previously mentioned, source coupling is enhanced by using a large number of notches, or a large-area discontinuity, whereas signal transmission through the waveguide is degraded by the same feature. Computer simulation can be used to reveal an optimal discontinuity size or notch depth and notch spacing for a given waveguide diameter and signal path length.

Acrylic and other plastics demonstrate prohibitively high attenuation of light at 1300 nm and 1550 nm. At 850 nm and below, the attenuation becomes reasonable. There is a trade-off here between the absorption of the material and the sensitivity of the detector since there is less attenuation at certain shorter wavelengths, but detectors are also less sensitive there. For larger diameter waveguide applications (more than 4 m perimeter) glass may be the best material for the waveguide in view of its lower attenuation properties.

Figure 3:
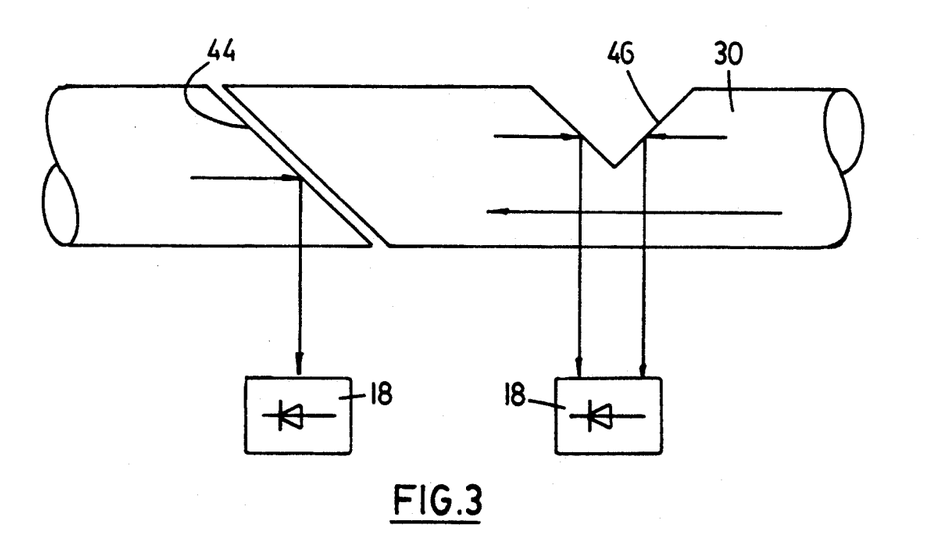
FIG. 3 shows two ways of transversely decoupling the light from a notched rod waveguide into a detector.

Light can be directed out of the waveguide to the detector 18 by inserting a full-diameter, angled facet or mirror 44 into the waveguide light path as shown in FIG. 3. This collects or reflects only the light travelling in one direction around the waveguide. A half-diameter notch 46 is also shown, which notch allows light to be collected or reflected from both directions, but with the potential penalty of an additional 3 dB loss assuming that all of the power is captured by the detector 18. There are also Fresnel losses but they have a comparatively small effect on efficiency.

After the light is directed out of the waveguide the main source of loss in coupling light to the detector is area mismatch. Ideally the diameter of the detector would be larger than the sectional diameter of the waveguide, thus allowing all photons, except those lost by reflection, to be intercepted by the detector. However, detectors of large area are generally rather slow and noisy.

Since short wavelengths are desired for reduced waveguide attenuation, silicon detectors may be the most suitable. Avalanche Photodiode Detectors (APDs) are the most sensitive silicon devices available, but are also very expensive, require complex support circuitry, and are environmentally unstable especially with regard to temperature. In addition they generally have small active areas which will not produce good power coupling from the notched waveguide. Standard silicon PIN devices, on the other hand, are roughly ten times less expensive, require simpler circuits, are more stable with temperature, and are available in a variety of sizes up to 1 cm in diameter. Although the larger PIN devices are slower and noisier, their performance is reliable and adequate for a system designed with sufficient input power.

FIGS. 4a to 4f illustrate schematically the four basic configurations, and options, that are available by using one or two light sources and/or one or two detectors. The annular waveguide is designated by the reference number 50, each source by the reference number 52, each detector by the reference number 54, each half-diameter reflector by the reference number 56, each full-diameter reflector by the reference number 58, and each light blocker or dam by the reference number 60.

Figure 4A:
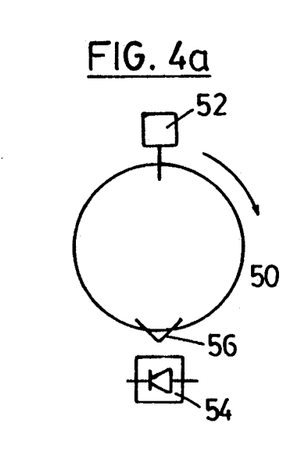
FIGS. 4a to 4f show four basic ring topologies, i.e. arrangements having one or two light sources and one or two detectors.
Figure 5:
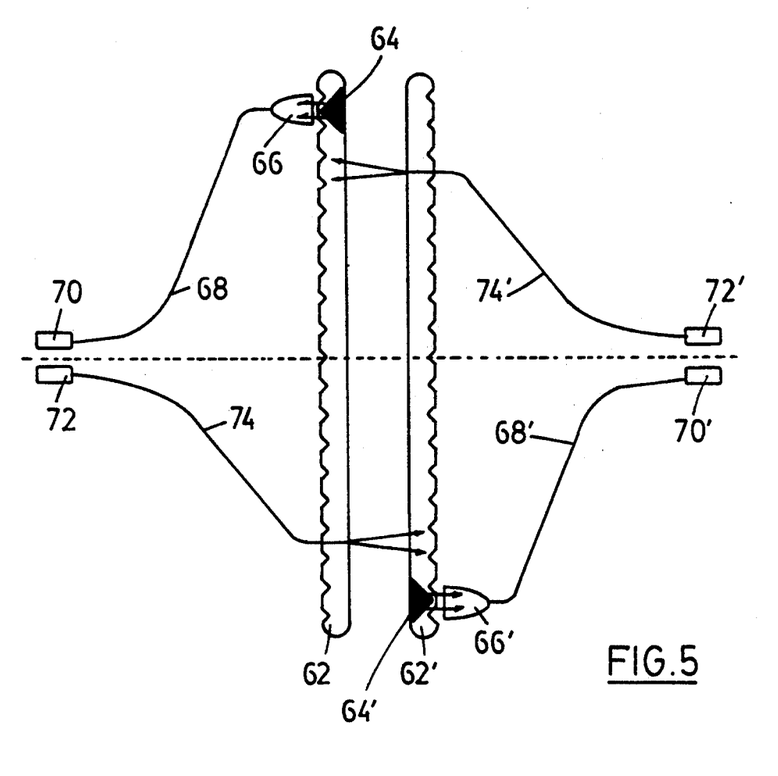
FIG. 5 is a schematic view of one embodiment of the present invention.

FIG. 4a shows the simplest and least expensive configuration with a single light source 52 positioned adjacent the waveguide 50 and rotatable thereabout. A single half-diameter reflector 56 is provided in the waveguide 50 to intercept light reflected along the waveguide by the notches therein. The intercepted light is reflected out of the waveguide 50 to the single detector 54 positioned adjacent the reflector 56. A more detailed example of this embodiment is shown in FIG. 5 and described hereinbelow.

Figure 4B:
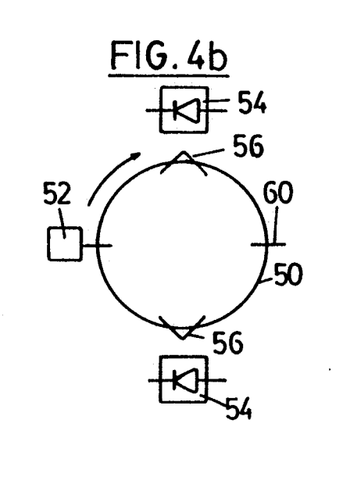

FIG. 4b shows a configuration using a single source 52 positioned adjacent the waveguide 50, between a pair of diametrically opposed half-diameter reflectors 56 and associated detectors 54. A light blocker 60 is positioned in the waveguide 50 halfway between the reflectors to prevent unwanted signals reaching either detector. Again, the light source 52 is rotatable relative to the waveguide, reflectors and detectors, the detected signals being an indication of the position of the light source around the waveguide.

Figure 4C:
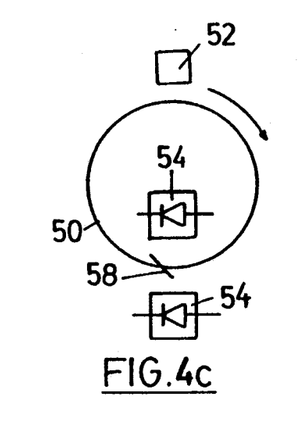

FIG. 4c shows another configuration using a single light source 52 and a pair of detectors 54. In this case there is a single full-diameter reflector 58 generally opposite the source 52 and the two detectors are positioned one adjacent the outer periphery of the waveguide and the other positioned adjacent the inner periphery of the waveguide, both of course being adjacent the reflector 58. Light travelling in one direction around the waveguide is reflected to one of the detectors while light travelling in the opposite direction is reflected to the other detector.

Figure 4D:
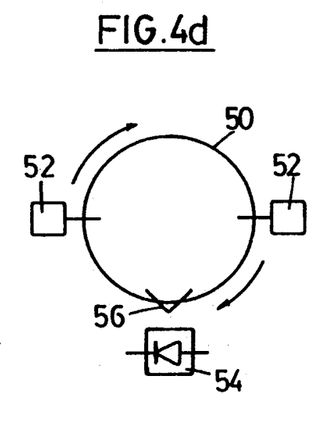

FIG. 4d shows an embodiment wherein two light sources 52 are positioned diametrically opposite each other for mutual rotation relative to the annular waveguide 50. A single half-diameter reflector is located between the light sources 52 and reflects light travelling in either direction to the single detector positioned adjacent the reflector.

Figure 4E:
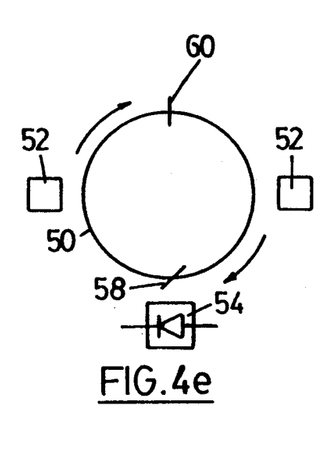

In FIG. 4e there are two diametrically opposed light sources 52 positioned for mutual rotation relative to the waveguide 50. In this case a single full-diameter reflector 58 is located between the sources for coupling light to the single detector 54 located adjacent thereto. A light blocker 60 is diametrically opposed to the reflector 58 to prevent light from travelling from one source towards the other and augmenting the signal strength of the light emanating therefrom.

Figure 4F:
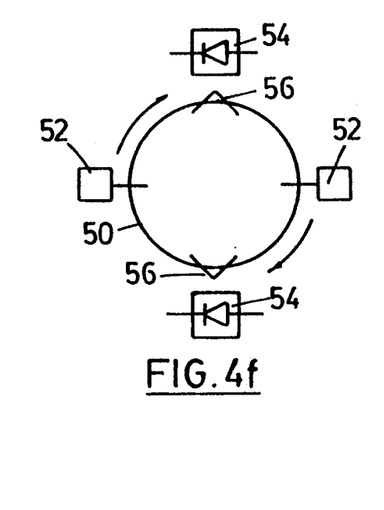

FIG. 4f shows an embodiment utilizing two diametrically opposed light sources 52 and two diametrically opposed half-diameter reflectors 56 and two diametrically opposed detectors 54, each detector being positioned adjacent a respective reflector 56. Again, the light sources are mutually rotatable relative to the waveguide 50, the reflectors and the detectors.

In each of the embodiments described above light emanates from the light source(s) 52, enters the waveguide 50 to be intercepted by the optical discontinuity, is reflected or scattered along the waveguide by the discontinuity and travels within the waveguide until it reaches the appropriate reflector 56 or 58. The travelling light is reflected out of the waveguide 50 to the detector 54 positioned adjacent the reflector. The signal strength at the detector is a measure of the distance around the waveguide that the light has travelled and thus is a measure of the location of the light source(s) relative to a datum line on the waveguide.

FIG. 5 illustrates schematically a bi-directional embodiment of the present invention using a simple source/detector configuration, namely that of FIG. 4a. While this configuration may be simple and inexpensive it, unfortunately, does not exhibit exceptional performance. The best cost/performance ratio is provided by a two-source, one-detector configuration as shown in FIGS. 4d or 4e, but for the sake of simplicity FIG. 5 shows a single source and detector embodiment.

FIG. 5 shows a pair of opposed, substantially identical annular notched waveguides 62,62′. Of course, the other optical discontinuities described herein could be used in place of the notches. Each waveguide has an internal reflector 64,64′ therein for reflecting light from the waveguide to appropriate collection optics 66,66′, such as a GRIN lens, positioned adjacent the reflector. The collection optics are connected via an optical fiber 68,68′ to an appropriate detector 70,70′ with the necessary interpretive circuitry therewith.

Suitable light sources 72,72′, such as laser diodes, are connected respectively via optical fibers 74,74′ in such a manner as to inject light into the opposing waveguide. Thus the source 72 provides light to the waveguide 62′ and the source 72′ provides light to the waveguide 62.

In the embodiment of FIG. 5 the elements 62,64,66,68,70,72 and 74 are contained within the stator portion of the rotary joint while the elements 62′,64′,66′,68′,70′,72′ and 74′ are contained within the rotor portion of the rotary joint. The rotor elements are all stationary with respect to the stator elements. Light travelling from the stator source 72 is intercepted by the rotating notched waveguide 62′ and is transmitted to the detector 70′ via the reflector 64′, the collection optics 66′ and the optical fiber 68′. The signal strength at the detector 70′ is a measure of the distance around the waveguide 62′ that the light from the source 72 has travelled and thus is a measure of the degree of rotation of the waveguide 62′ relative to the waveguide 62. The measure of angular position could be useful in some applications such as the CT scanner described below. The associated variation in signal strength also defines the dynamic range demanded of the receiver. Light travelling in the opposite direction from the rotating source 72′ is intercepted by the stationary notched waveguide 62 and passed to the detector 70 in a similar manner. The signal strength at the detector 70 is a measure of the degree of rotation of the waveguide 62′ relative to the waveguide 62.

Figure 6:
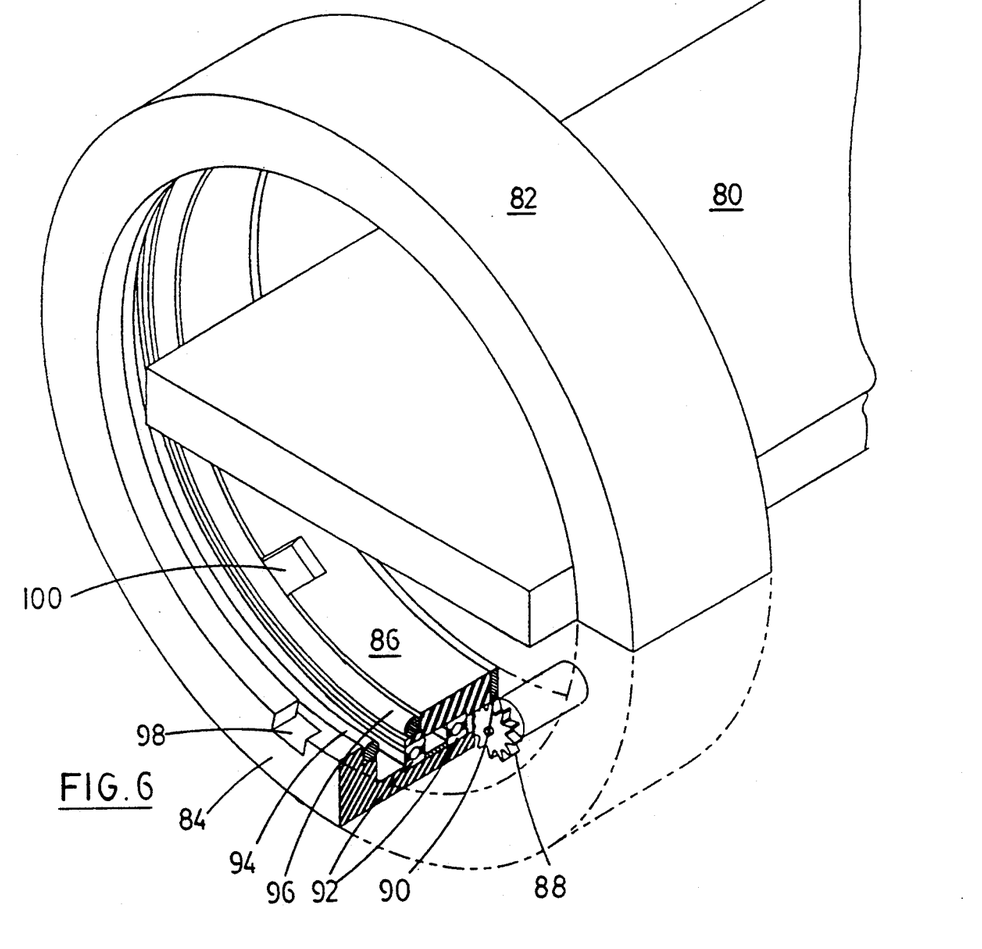
FIG. 6 is a perspective view of a typical application for the present invention, namely a CT scanner.

A practical embodiment of the present invention is illustrated in FIG. 6, albeit somewhat schematically. A CT scanner for CAT scans includes a bed 80 for a patient, which bed traverses through a hoop 82 which includes a stationary part 84 and a rotating part 86. The rotating part 86 will contain X-ray sensors with electrical power provided thereto by conventional ring/brush slip rings as is well known in the art. The optical waveguides carry control signals in and X-ray data out of the system. Rotating part 86 is driven by a small gear 88 which engages a large diameter gear 90 affixed to the rotating part 86. Two bearings 92 are located between the stationary and rotating parts.

Each of the parts 84 and 86 includes an annular waveguide 94 and 96 respectively. The waveguides, being optical, have the high bandwidth and freedom from interference that are desirable features for transmission of the X-ray signals. Each of the stationary and rotating parts also includes a recess 98,100 for mounting the light sources and detectors. By locating the components generally as in FIG. 5 or, by extension, as in FIG. 4d or 4e, it is possible to obtain a very accurate indication of the position of the rotating part 86 relative to the stationary part 84 while leaving the central "shaft" area of the apparatus free for movement of the bed 80. This knowledge of the rotational position may be useful in defining the position of the X-ray section.

The foregoing is but one of many applications for the technology of the present invention and should not be considered as limiting. Undoubtedly, skilled personnel will find many other practical applications for this technology.

As indicated previously, one is always concerned with optical signal losses with such systems. The large optical loss involved in a system using an acrylic waveguide (>40 dB) appears to be a significant problem but it can be alleviated easily by simply injecting more power in at one or more locations and/or by using more detectors. This does not reduce the importance of minimizing losses, however, since each decibel of optical power translates into two decibels of electrical power at the detector.

The dynamic variation in optical power as the ring rotates creates the need for a detector design which can track changes in average received power which, in turn, necessitates a signalling scheme with a guaranteed duty cycle. At the worst the dynamic range will be around 6-10 dB and will be of a slowly varying nature compared to the bit times, i.e. milliseconds versus nanoseconds. Dynamic threshold detectors suitable for this type of application are commercially available.

Once the optical signal has been detected, there are several receiver circuits which may be used to decode the signal. This depends somewhat on the format of the signalling, but generally speaking, the more structured the signal the lower the signal-to-noise ratio (SNR) needed to decode it accurately. Details of the receiver are well within the purview of a skilled engineer and need not be presented here.

In summary, therefore the present invention provides structure which enables one to obtain the benefits of optical signal transmission in a rotary joint while also enabling on to utilize the central "shaft" area of the joint for purposes other that signal transmission. The present invention provides an off-axis optical rotary slip joint that is simple to produce and yet provides for the very accurate transmission of optical signal data across the joint. While several configurations of the present invention have been disclosed herein it is clear that other configurations and applications are possible without departing from the spirit of the invention. Thus the protection to be afforded this invention is to be determined from the claims appended hereto.

We claim:

1. An optical rotary joint for off-axis optical signal transfer comprising: a source of light; an annular optical waveguide member having optical discontinuity means for intercepting a light beam emanating from said source and directing the light beam into said waveguide member; means for reflecting light out of said waveguide member; and detector means adjacent said reflecting means for intercepting light reflected out of said waveguide member; said light source being rotatable relative to said waveguide member, reflecting means and detector means.

2. An optical rotary joint for off-axis bi-directional optical signal transfer comprising: first and second sources of light; first and second adjacent annular optical waveguide members, each having optical discontinuity means for intercepting a light beam emanating from a respective one of said sources and directing the beam into the respective waveguide member; first and second means for reflecting light out of a respective said waveguide member; and first and second detector means adjacent a respective said reflecting means for intercepting light reflected out of the adjacent waveguide member; said first waveguide member, reflecting means and detector means being rotatable relative to said second waveguide member, reflecting means and detector means.

3. The joint of claim 1 or claim 2 wherein said optical discontinuity means is selected from the group comprising a plurality of circumferentially equally space apart notches directed inwardly of the waveguide member, a roughened or abraded area on the surface of the waveguide member, a groove in the surface of the waveguide member and extending circumferentially of the waveguide member, or a beam splitter within the waveguide member.

4. The joint of claim 3 wherein the source of light is a light emitting diode.

5. The joint of claim 3 wherein the source of light is a laser diode.

6. The joint of claim 4 wherein the source of light is located remote from the waveguide member and light is communicated from the source to the waveguide member by a length of optical fiber.

7. The joint of claim 5 wherein the source of light is located remote from the waveguide member and light is communicated from the source to the waveguide member by a length of optical fiber.

8. The joint of claim 4 wherein the detector means is a PIN device.

9. The joint of claim 5 wherein the detector means is an avalanche photodiode.

10. The joint of claim 1 including a single source of light and a pair of diametrically opposed detector means, each detector means having a reflecting means associated therewith.

11. The joint of claim 2 wherein each of said first and second light sources includes a single source of light and there is provided for each waveguide member a pair of diametrically opposed detector means with each detector means having a reflecting means associated therewith.

12. The joint of claim 1 including a pair of diametrically opposed sources of light and a pair of diametrically opposed detector means between the light sources with each detector means having a reflecting means associated therewith.

13. The joint of claim 2 wherein each of said first and second sources includes a pair of diametrically opposed sources of light and there is provided for each waveguide member a pair of diametrically opposed detector means between the light sources with each detector means having a reflecting means associated therewith.

14. The joint of claim 1 including a pair of diametrically opposed sources of light, a single detector means located between the light source pair, and light blocking means in said waveguide member opposite said detector means.

15. The joint of claim 2 wherein each of said first and second sources includes a pair of diametrically opposed sources of light and there is provided for each waveguide member a single detector means located between the light source pair and light blocking means opposite said detector means.

16. The joint of any one of claims 11 to 15 wherein said optical discontinuity means is selected from the group comprising a plurality of circumferentially equally spaced apart notches directed inwardly of the waveguide member, a roughened or abraded area on the surface of the waveguide member, a groove in the surface of the waveguide member and extending circumferentially thereof, or a beam splitter within the waveguide member.

17. The joint of claim 16 wherein each said reflecting means comprises a half-diameter notch in the waveguide member, said half-diameter notch being symmetrical to a radius of the waveguide member and having an included angle of about 90°.

18. The joint of claim 16 wherein each said reflecting means comprises a mirrored surface angled at about 45° to said waveguide member and extending across the full cross-section of said waveguide member.

19. The joint of claim 1 or claim 2 wherein said optical discontinuity means comprises a plurality of circumferentially equally spaced apart notches in the surface of said waveguide member, each said notch being symmetrical to a radial plane of the waveguide member and having an included angle of about 90°.

20. The joint of claim 1 or claim 2 wherein said optical discontinuity means comprises a plurality of equally spaced apart notches in the surface of said waveguide member, each notch having a first angled side at about 45° to a radial plane of the waveguide member, a bottom side at about 90° to the radial plane, a short radial side extending outward from the bottom side parallel to the radial plane, and a second angled side making an included angle with the first side of about 90°.

21. The joint of claim 3 wherein the detector means is located remote from the waveguide member and light is communicated from the waveguide member to the detector means by a length of optical fiber.

22. The joint of claim 3 wherein the waveguide member is manufactured from a clear thermoplastic material.

23. The joint of claim 22 wherein the material is an acrylic plastic.

24. The joint of claim 3 wherein the waveguide member is manufactured from clear glass.

25. The joint of claim 3 including a differential A-C coupled receiver circuit associated with said detector means.

26. The joint of claim 3 wherein said detector means is integrated with a preamplifier on a single silicon substrate.

27. The joint of claim 21, including a differential AC coupled receiver circuit associated with said detector means.

28. The joint of claim 21, wherein said detector means is integrated with a preamplifier on a single silicon substrate.

29. An optical rotary joint for off-axis optical signal transfer, comprising:
a source of light;
an optical waveguide member having an axis of propagation;
means directing a light beam from said source toward said waveguide and generally transversely of said axis of propagation;
optical discontinuity means for intercepting said light beam and coupling at least a portion of said light beam into said waveguide member for travel within said waveguide member along said axis of propagation;
means for reflecting light out of said waveguide member; and
detector means adjacent said reflecting means for intercepting light reflected out of said waveguide member, said light source being rotatable relative to said waveguide member, reflecting means and detector means.

30. The joint of claim 29, wherein said optical discontinuity means is selected from the group comprising (a) a plurality of circumferentially equally spaced apart notches directed inwardly of the waveguide member, (b) a roughened or abraded area on the surface of the waveguide member, (c) a groove in the surface of the waveguide member and extending circumferentially of the waveguide member; and (d) a beam splitter within the waveguide member.

* * * * *